United States Patent [19]

Rascle et al.

[11] Patent Number: 4,588,369
[45] Date of Patent: May 13, 1986

[54] APPARATUS FOR REMOVAL OF A DATA CARRIER DISK AFTER MOLDING

[75] Inventors: Roger Rascle; François Langé, both of Paris, France

[73] Assignee: Thomson-CSF, Paris, France

[21] Appl. No.: 673,147

[22] Filed: Nov. 19, 1984

Related U.S. Application Data

[62] Division of Ser. No. 414,310, Sep. 2, 1982, Pat. No. 4,500,486.

[30] Foreign Application Priority Data

Oct. 6, 1981 [FR] France .................. 81 18788

[51] Int. Cl.⁴ .................................. B29D 17/00
[52] U.S. Cl. .................... 425/437; 425/556; 425/810
[58] Field of Search ............ 264/106, 107, 335; 425/810, 437, 556

[56] References Cited

U.S. PATENT DOCUMENTS

| | | | |
|---|---|---|---|
| 2,528,611 | 11/1950 | Saffady | 264/107 |
| 3,584,094 | 6/1971 | Rock et al. | 264/107 |
| 3,660,002 | 5/1972 | Morroni | 425/405 |
| 3,937,779 | 2/1976 | Simmons | 264/106 |
| 4,157,931 | 6/1979 | Bricot et al. | 156/230 |
| 4,312,823 | 1/1982 | Kraakman et al. | 425/437 |
| 4,340,353 | 7/1982 | Mayer | 264/106 |
| 4,381,964 | 5/1983 | Lock | 264/335 |
| 4,405,540 | 9/1983 | Mayer | 264/106 |

FOREIGN PATENT DOCUMENTS

| | | | |
|---|---|---|---|
| 1504974 | 10/1965 | Fed. Rep. of Germany. | |
| 1194131 | 11/1959 | France. | |
| 51-100155 | 2/1975 | Japan | 264/335 |
| 892794 | 3/1962 | United Kingdom | 264/572 |

Primary Examiner—Willard E. Hoag
Attorney, Agent, or Firm—Cushman Darby & Cushman

[57] ABSTRACT

A disk which carries information obtained by molding from a cut matrix is detached from the matrix by means of a gas jet injected between the disk and the cut matrix. The disk is maintained in contact with the matrix both at the periphery and at the center, means being also provided for limiting deformation of the disk while it is being removed.

14 Claims, 8 Drawing Figures

APPARATUS FOR REMOVAL OF A DATA CARRIER DISK AFTER MOLDING

This is a division, of application Ser. No. 414,310, filed Sept. 2, 1982, now U.S. Pat. No. 4,500,486.

This invention relates to a method for the removal of a disk after molding on a matrix which carries items of information in the form of microelevations.

On a disk of this type, information or data items are recorded on a track consisting of a spiral or of concentric circles and formed by a succession of elements having dimensions which can be of the order of one micron, namely depressions or elevations as the case may be. One method of fabrication of a disk of this type is described in European patent application No. 80 401 241.7 filed on Aug. 29th, 1980 and published under No. EP-A-0-0 025 387.

For some applications, it may prove useful to obtain a fairly appreciable number of identical copies from an original disk. This entails the need for a specially cut matrix which will serve only for duplication, that is, for a disk which can be recorded and read by the user.

Many copying processes are already known, especially those which involve pressing techniques of the type employed for audio records and call for the use of thermally deformable plastic material. Although pressing methods are well-suited to series production, they entail the need for heavy equipment which is both cumbersome and costly.

Molding processes, however, are better suited to production and consist in contacting a matrix and a substrate with at least one intermediate molding agent. In this case, the equipment is lighter in weight, easier to use, low in capital cost, and can be installed in any premises under the same condition as equipment for the reproduction of documents, for example, and on the actual service location. Furthermore, molding does not give rise to any mechanical stresses at the level of the relief impression and ensures higher fidelity of reproduction than pressing. One of the problems encountered, however, is that of removal of the disk after molding.

The method of the prior art permit the achievement of this result by applying a tractive force to the disk.

The effort which is thus necessary for the removal or "stripping" of the disk produces streses within the disk and the resultant deformations of this latter are liable in some instances to affect the quality of the recording. This leads to the study of an improved method of stripping which limits the potential danger of damage to the track and therefore ensures preservation of stored data.

The invention is directed to a method for removal of a molded disk which carries data in the form of surface microelevations, said disk being obtained by molding at the surface of a cut matrix. In accordance with said method, a gas is injected between said disk and said cut matrix in order to cause detachment of the disk with respect to said matrix, the disk being maintained in contact with the cut matrix concentrically on each side of the recorded zone.

The invention is also directed to a device for the practical application of said method.

Other features of the invention will be more apparent upon consideration of the following description and accompanying drawings, wherein.

Figure 1:
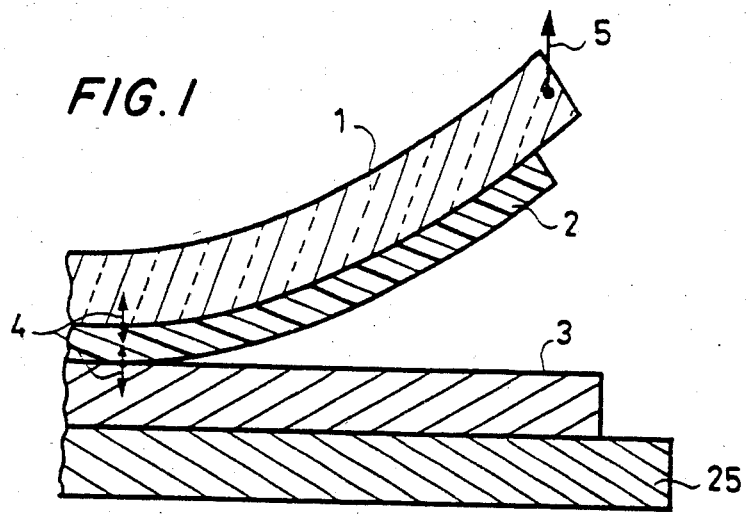
FIG. 1 illustrates a method of the prior art.

As shown in FIG. 1, the methods of the prior art serve to obtain detachment of the disk by applying a tractive force 5 on this latter at right angles to the surface of the matrix. In the case of FIG. 1, the disk 1 has been molded on the matrix 3 by means of an intermediate molding agent 2 such as, for example, resin which has been allowed to harden. The arrows 4 represent the force which tends to produce detachment of the disk 1 and of the molding agent 2 from the matrix 3. By way of example, the disk can be formed of Plexiglas and the matrix can be formed of a metal such as nickel. In the case of FIG. 1, it is necessary to maintain the matrix in position during the stripping operation.

As described in the patent application cited earlier, molding and stripping are performed by means of a circular ring which supports the disk at its periphery, both at the time of molding while the presser applies the disk progressively against the matrix and at the time of stripping when the matrix is held in position on the turntable, whereupon the ring returns upwards to the original position and thus has the effect of lifting the disk.

Removal or stripping performed by this method calls for several comments:

The force of detachment is related to the flexibility of the disk; in actual fact, the stripping effort is limited by the flexural deformation which the disk is capable of withstanding prior to failure or prior to damage caused by deformation.

The fact of removing the disk gives rise in the detachment zone, not only to useful stresses which are perpendicular to the plane of the disk and are necessary for removal by stripping, but also to parasitic stresses which are liable to impair or damage the recording. In particular, since the disk face is stretched on the recording side, tangential stresses appear between disk and matrix and have a tendency to shear the relief.

The force required for detachment varies during stripping as a function of the leverage effect and of the length of line during the process of detachment. If the tractive force applied to the disk is constant, appreciable variations are observed in the rate of detachment, especially at the end of stripping when all the energy stored in the deformed disk is released, thus increasing the potential danger of damage to the recording.

The point of application against the disk is located at an appreciable distance from the point of detachment. This may give rise to displacement of the disk by slippage with respect to the matrix, which is in turn liable to shear the recording. This phenomenon is particularly marked at the end of stripping, when only a few square millimeters of recording still remain in contact.

The method according to the invention makes it possible to attain a very large force of detachment which could not have been obtained by any other method. In particular, the force of detachment is no longer related to the flexibility of the disk.

The method under consideration therefore permits removal of molded disks which have a very high degree of flexibility.

In the case of utilization of disks which are molded on a matrix by means of an intermediate molding agent, said method permits removal of molded disks even in the event of low adhesion of said molding agent to the disk.

Furthermore, there is no longer any potential danger of impairment of the recording as a result of slippage at the time of removal by stripping.

Figure 2:
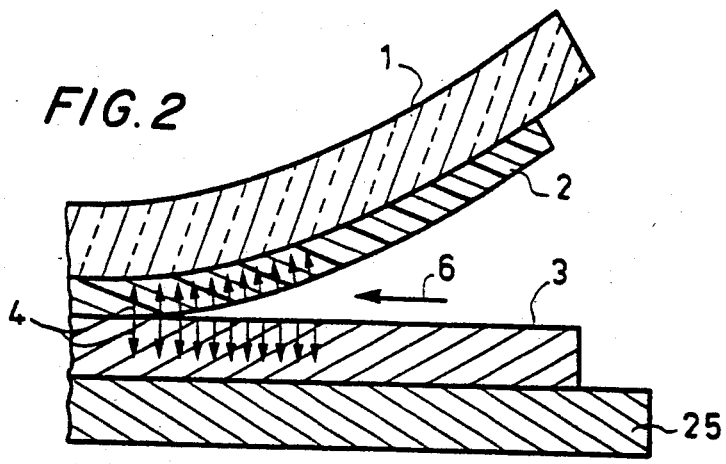
FIGS. 2 to 7 illustrate a number of particular aspects of the method according to the invention.

The method according to the invention consists in injecting between disk 1 and matrix 3 a gas jet 6 which causes detachment as shown in FIG. 2. Compressed air, nitrogen or any other suitable gas may be employed for this purpose.

In this type of stripping operation, it is possible by combining pressure and flow rate to attain a very large force of detachment which could not possibly have been achieved by means of a different method. In particular, the force of detachment is no longer related to the degree of flexibility of the disk 1.

This method therefore permits the stripping of very flexible disks but clearly remains well suited to flexible disks in general as well as to rigid disks. One advantage of this method of stripping which is particularly significant in the case of disks molded on a matrix 3 by means of an intermediate molding agent 2 such as resin which has been allowed to harden, lies in the fact that the gas jet 6 penetrates between the molding agent 2 and the matrix 3, thus applying pressure on these latter and making it possible to perform a stripping operation even in the event of low adhesion of the molding agent 2 to the disk 1. On the other hand, at the time of stripping by applying traction to the disk, the molding agent 2 itself is subjected to a tractive force which tends to detach this latter from the disk 1 as shown in FIG. 1.

In this figure and in the following figures, the matrix 3 rests on a turntable 25 which serves as a bearing plate. In the method of stripping in accordance with the invention, there is no longer any need to maintain the matrix in position.

In this method of the invention, the injected gas 6 applies pressure on the disk 1 or on the molding agent 2 as shown in FIG. 2 and on the matrix 3 at the point of detachment. Slippage and the attendant hazards to which the recording was exposed as a result of slippage in the prior art are no longer liable to occur.

One point worthy of note is the fact that detachment takes place only when the pressure between the disk and the matrix remains at a sufficient value, for example when the pressure is of the order of one bar. When detachment of the disk reaches the periphery of this latter over only a portion of the perimeter, the gas is consequently allowed to escape, thus producing a pressure drop and slowing-down or stopping the stripping process.

This is a frequently occurring phenomenon since the stripping operation is dissymmetrical in the majority of instances.

In the remaining figures, the molding medium 2 has not been illustrated but the corresponding description is equally applicable to stripping in the presence of said molding medium 2.

Figure 3:
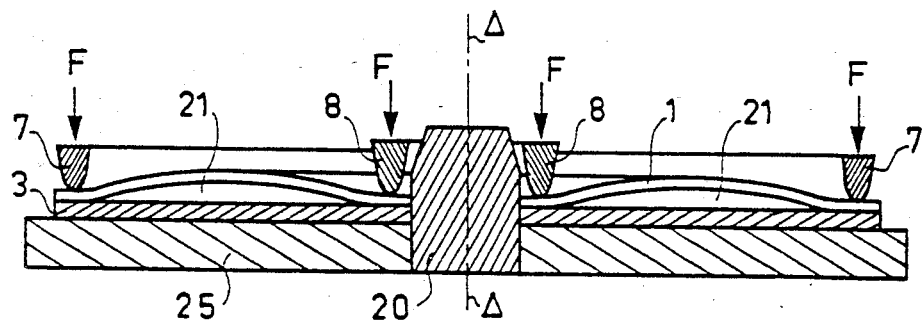

The disadvantage noted in the foregoing can be overcome by providing a gas-tight seal between disk and matrix, not only at the periphery of the disk but also in the proximity of the centering nose which serves to position the disk and the matrix. One solution shown in FIG. 3 consists in applying considerable pressure on the disk 1 at the point which is to be made leak-tight. This can be achieved, for example, by exerting a force F on rings 7 and 8 which are placed concentrically one each side of the recorded zone to be stripped. In this figure, the symbol Δ represents the axis of symmetry, the reference numeral 20 designates the centering nose of the disk and the reference numeral 21 represents the pocket into which the gas has been injected.

By way of example, the aforementioned rings 7 and 8 can be O-ring seals of elastic material. They serve to form a bearing ring on the disk 1 in order to maintain this latter in contact with the matrix 3. The bearing force applied on said rings can be of the order of a few decanewtons, for example.

The injection of gas or compressed air can be carried out in different ways such as, for example, by means of a nozzle located at the periphery of the disk, a flanged annular member provided with a gas admission nozzle having previously been inserted between the disk and the matrix. Injection can also be performed by means of a nozzle which passes through an uncut portion of the matrix or an unrecorded portion of the disk, or else through the centering nose which is specially designed for this purpose. A number of injection points can be employed. By making a judicious choice of the injection point or points, it is also possible to provide a preferential stripping direction, for example from the periphery of the disk to its center.

Figure 4:
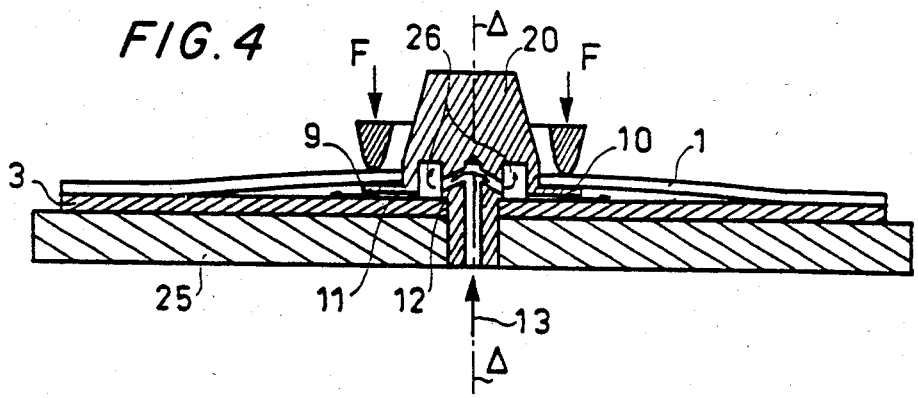

FIG. 4 shows one example of stripping by means of the centering nose.

In this example, the centering nose 20 has an annular flange 10 which is interposed between the disk 1 and the matrix 3 at the moment of molding.

Grooves 11 are formed in said annular flange 10 in order to serve as passages for the admission of gas. The annular flange thus performs the function of a gas injection nozzle. The small gap left between the disk and the matrix as a result of the thickness of the annular flange facilitates the flow of gas towards the molded zone to be removed from the matrix.

Gas-tightness is ensured between the disk 1 and the centering nose 20 at the point designated by the reference numeral 9 and also between the matrix 3 and said centering nose 20 at a point designated by the reference numeral 12. The chambers 26 represent reservoirs which serve to equalize the pressure of injected gas.

This figure shows the disk 1 in the deformed state and centered by means of the nose 20. In actual fact, a centering nose provided with an annular flange having a thickness of two-tenths of a millimeter and provided with eight grooves having a depth of one-tenth of a millimeter has proved satisfactory in practice. Under operating conditions, it has been found that the small dimensions of said annular flange do no affect or distrub the molding of the disk.

Figure 5:
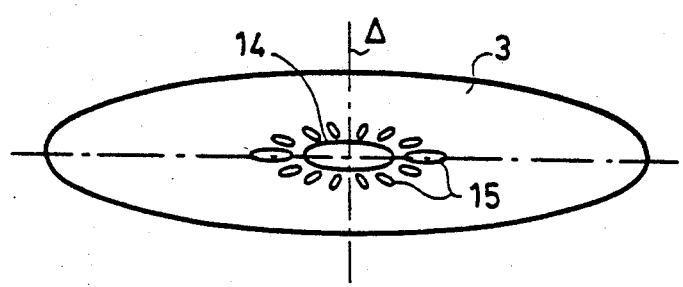

As can readily be understood, said annular flange 10 can be fitted separately and can be flush-mounted in the matrix 3 or in the disk 1 and striae or grooves of any suitable shape for injection purposes can be formed in said disk and said matrix. FIG. 5 illustrates one example of a die-stamped matrix 3 which facilitates the flow of gas and starting of the stripping process. The reference numeral 14 designates the centering hole, the symbol Δ designates the axis of symmetry and the reference numeral 15 designates bosses on which the disk 1 is intended to rest. Said bosses serve as spacer elements between the disk 1 and the matrix 3 so as to provide passageways for the admission of gas.

Figure 6:
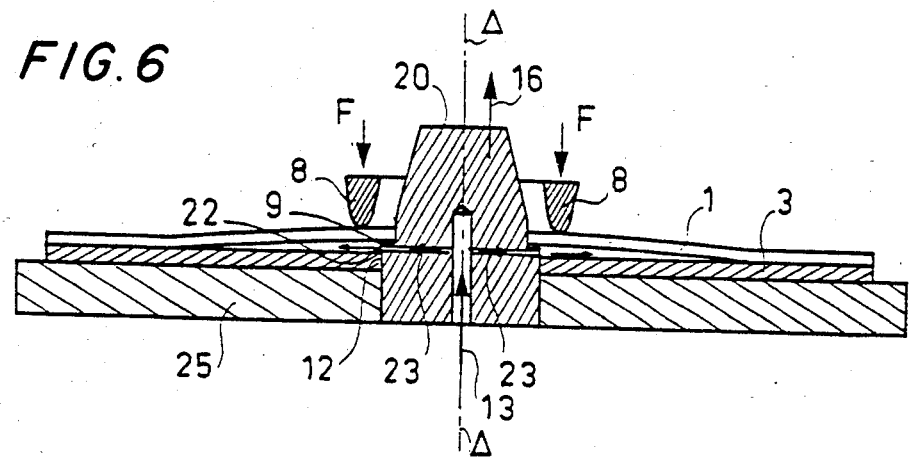

FIG. 6 illustrates another example of gas injection through the centering nose 20 in the direction of the arrow 13. In this example, the nose 20 is capable of undergoing a movement of translational displacement 16 in the direction of the axis of symmetry Δ immediately prior to removal of the disk in order to free the injection nozzles 22 and to lift said disk 1 to a slight extent in order to facilitate the admission of gas through the passage 23.

Figure 7:
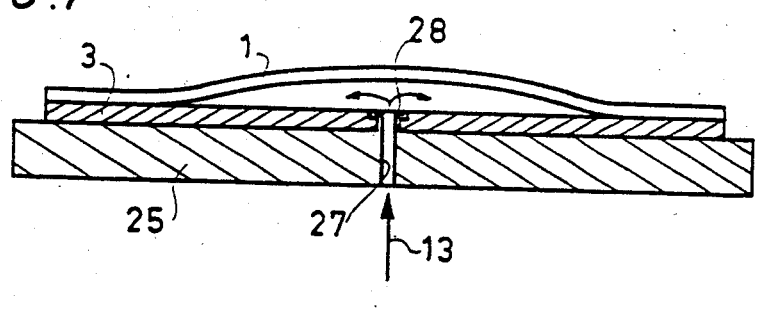

FIG. 7 illustrates an example of injection of gas in the direction of the arrow 13 and through the matrix 3, the gas being admitted into a portion located outside the recording. The reference numeral 27 designates a small tube with an annular flange 28 which is applied against the matrix 3 under the pressure of the gas.

It should be pointed out, especially in the case of flexible disks, that the disk has a tendency to "swell" under the action of pressure. The resultant deformation induces stresses within the disk at the point of detachment.

In order to prevent any relapse into the disadvantage of the so-called "disk-pulling system", this deformation must accordingly be limited.

Figure 8:
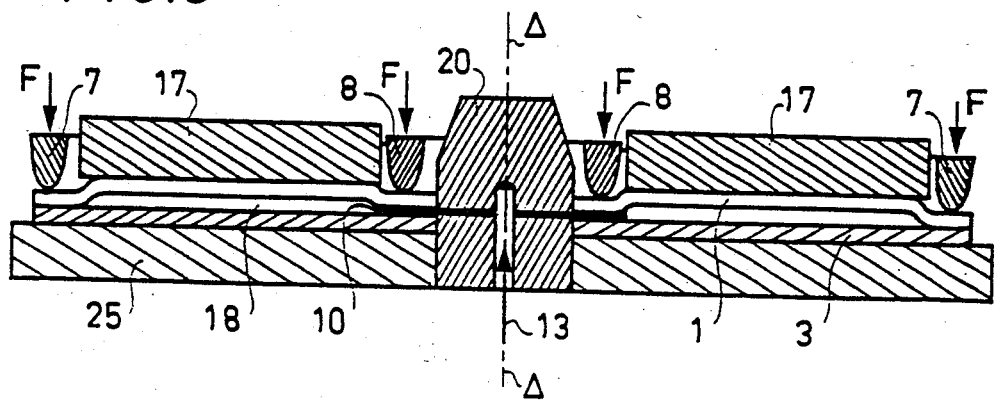
FIG. 8 illustrates the method according to the invention.

To this end, one possibility consists, for example, in placing a rigid cover-plate 17 above the disk 1 and parallel to this latter as shown in FIG. 8, the function of said cover-plate being to prevent any deformation of the disk beyond a lifting height 18 of a few tenths of a millimeter.

In FIG. 8, an annular flange 10 is shown as in FIG. 4 in order to permit admission of gas which produces detachment via grooves 11.

A further possibility for inhibiting deformation consists in using a pressing component which may form part of the press itself if it has been used for production of the disk and which will be maintained either in contact with or in close proximity to the disk.

As will be apparent, this anti-deformation plate will have to be adapted to the system which serves to provide a gas-tight seal between the disk and the matrix.

By making use of a disk having a diameter of 300 millimeters and a thickness of 1.5 millimeter in respect of a height of relief of approximately 0.1 micrometer, good results have been obtained with an injected gas pressure of 1.5 bar, gas-tightness and anti-deformation means being provided by a single plate fitted with O-ring seals at the periphery and near the center. The injection system is of the "annular flange" type and the complete assembly is maintained beneath the pressing unit which has served to mold the disk with a force of the order of 300 decanewtons. Removal of the disk is accordingly obtained within a time interval of the order of one second.

When the removal operation has been completed, the disk must be maintained in position by mechanical means after the injection has been cut-off in order to prevent any further contact between the disk and the matrix.

What is claimed is:

1. An apparatus for removing a molded record disk of the type having a substrate coated with a layer of a hardened molding agent carrying in an annular area are thereof a relief impression of surface irregularities which are copied into the layer prior to removal of the record disk, said apparatus comprising:
   a planar disk shaped stamping die including surface irregularities to be copied into the record disk layer, said molding agent layer being disposed between said substrate and said recorded surface;
   clamping means for clamping an outer annular portion of the molded record disk against the recorded surface to form a seal at said outer portion and to thereby establish, between said recorded surface and one surface of said substrate, an air-tight inflatable chamber which includes said annular area, said clamping means for preventing escape of a pressurized fluid from the inflatable chamber;
   duct means having an opening in fluid communication with said inflatable chamber for allowing the pressurized fluid to pass into said inflatable chamber, said fluid responsively causing said annular area to bend; and
   cover plate means in confronting relationship with the other surface of said substrate and defining therewith a gap, said cover plate means for controling the amount of bending of said annular area by virtue of said established gap upon inflation of said inflatable chamber by said pressurized fluid, wherein the controlled bending of said annular area effects an annular loss of contact between said annular area and said molded record disk.

2. An apparatus as in claim 1 wherein said molded record disk includes a central aperture and wherein said apparatus further comprises inner clamping means for clamping an inner annular portion of the molded record disk to form a second seal disposed between said central aperture and said first-mentioned seal, and wherein said inflatable chamber is thereby established between said first-mentioned seal and said second seal to prevent said pressurized fluid from escaping through said central aperture.

3. An apparatus as in claim 2 further comprising centering nose means for operatively cooperating with said central aperture.

4. An apparatus as in claim 3 wherein said centering nose means includes a flange and wherein said inner clamping means clamps said inner annular portion against said flange.

5. An apparatus as in claim 3 wherein said centering nose means includes at least a portion of said duct means.

6. An apparatus as in claim 4 wherein said centering nose means includes at least a portion of said duct means.

7. An apparatus as in claim 6 wherein said opening is defined by said flange means.

8. An apparatus for removal, from a planar disk-shaped stamping die, of a moled record disk having a layer of hardened molding agent sticking to a recorded surface of said stamping die and carrying in an annular area thereof a relief impression of surface irregularities which are copied into said layer prior to said removal, said apparatus comprising:
   (a) clamping means for clamping an outer annular portion of the molded record disk against the recorded surface to form a seal at said outer portion and to thereby establish, between said recorded surface and one surface of said molded record disk, an air-tight inflatable chamber which includes said annular area, said clamping means preventing escape of a pressurized gas introduced into the inflatable chamber to thereby permit the annular area to bend;
   (b) duct means for establishing fluid communication with said inflatable chamber, said duct means having an opening which terminates at a position in said inflatable chamber; and
   (c) cover plate means in confronting relationship with the other surface of said molded record disk for establishing a gap with the other surface of said molded record disk, said cover plate means for controlling the bending amount of said annular area into said established gap upon introduction of the pressurized gas through said duct means to thereby effect an annular loss of contact between said annular area and said molded record disk.

9. An apparatus as in claim 8 wherein said molded record disk includes a central aperture and wherein said apparatus further comprises inner clamping means for clamping an inner annular portion of the molded record disk to form a second seal disposed between said central aperture and said first-mentioned seal, and wherein said inflatable chamber is thereby established between said first-mentioned seal and said second seal to prevent said pressurized fluid from escaping through said central aperture.

10. An apparatus as in claim 9 further comprising centering nose means for cooperating with said central aperture.

11. An apparatus as in claim 10 wherein said centering nose means includes a flange and wherein said inner clamping means clamps said inner annular portion against said flange.

12. An apparatus as in claim 10 wherein said centering nose means includes at least a portion of said duct means.

13. An apparatus as in claim 11 wherein said centering nose means includes at least a portion of said duct means.

14. An apparatus as in claim 13 wherein said opening is defined by said flange means.

* * * * *